UNITED STATES PATENT OFFICE.

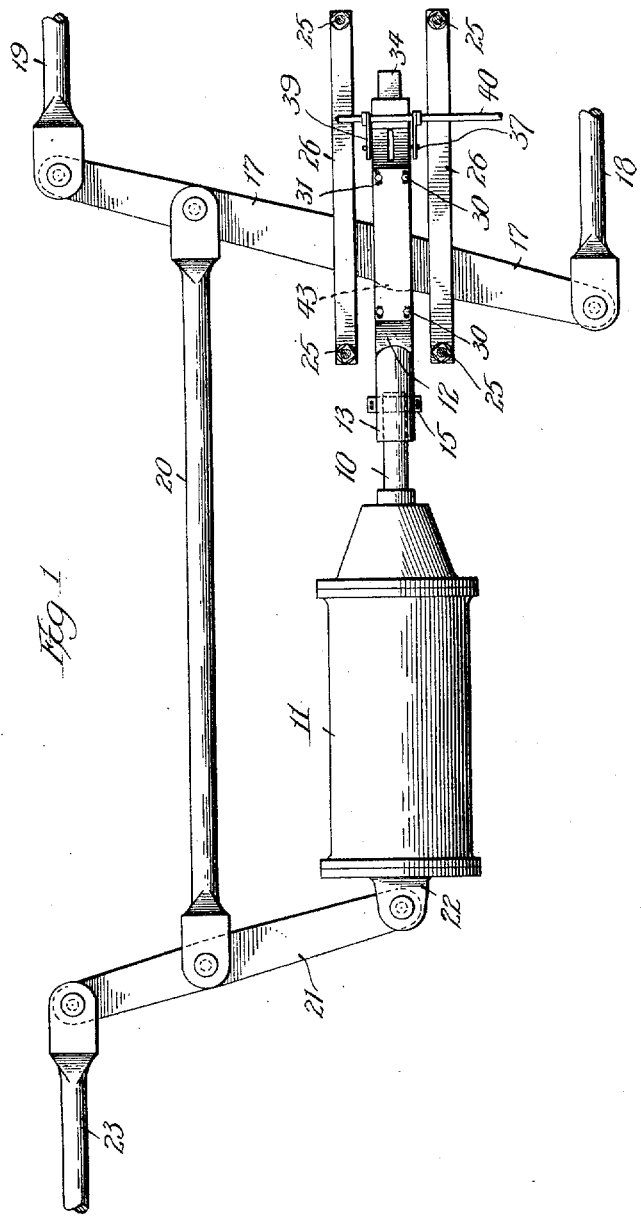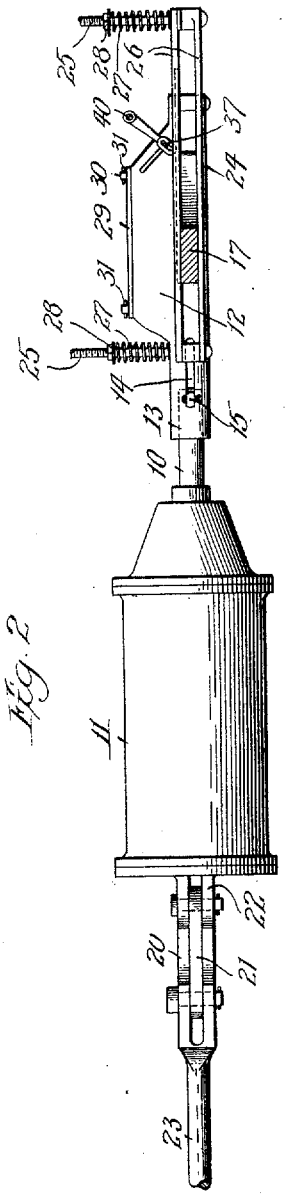

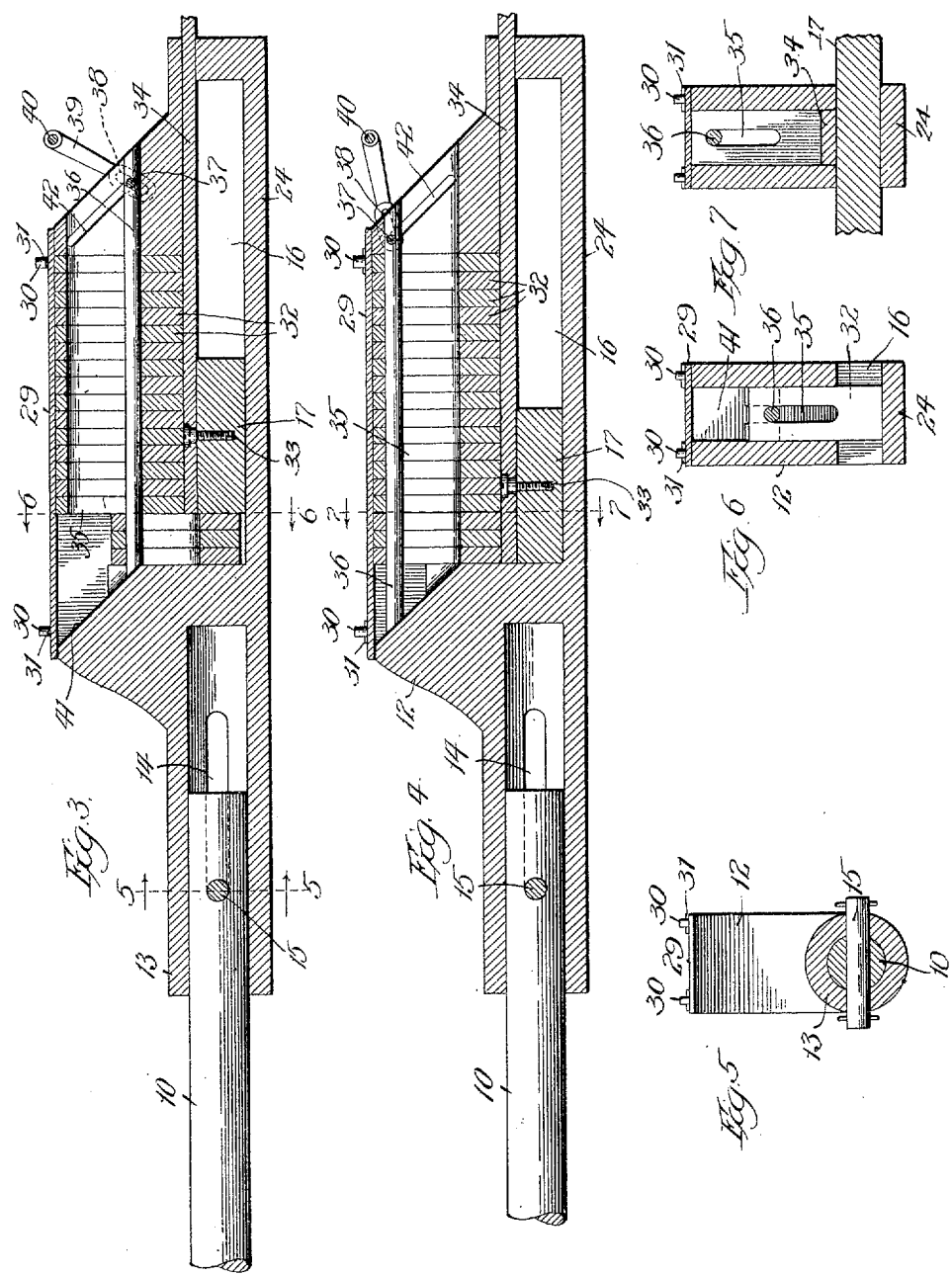

CYRUS L. BUNDY, OF KINGSLAND, NEW JERSEY, ASSIGNOR OF FIFTY-ONE PER CENT. TO WALTER P. MURPHY, OF CHICAGO, ILLINOIS, AND TWENTY-FOUR AND FIVE-TENTHS PER CENT. TO JULIUS J. ACKER, OF HORTON, KANSAS.

SLACK-ADJUSTER FOR BRAKES.

988,970.  Specification of Letters Patent.  Patented Apr. 11, 1911.

Application filed June 4, 1910. Serial No. 564,942.

*To all whom it may concern:*

Be it known that I, CYRUS L. BUNDY, a citizen of the United States, and a resident of Kingsland, Bergen county, New Jersey, have invented certain new and useful Improvements in Slack-Adjusters for Brakes, of which the following is a specification.

My invention relates to slack adjusters for brakes and is particularly designed to automatically compensate for the wear on brake shoes as used in the ordinary and well known air brake systems.

I am aware it is well known to use means for compensating for the wear on brake shoes, this ordinarily being accomplished by some suitable take-up device used in connection with the live lever rods. These rods ordinarily are allowed a certain predetermined amount of movement in going from their application to their release positions, and the take-up mechanism is designed to operate in connection with the further movement of the live lever rods as wear increases on the brake shoes.

In my improved device, the push rod used in connection with the brake cylinder, has a certain predetermined amount of lost motion before it moves the various parts associated with the cylinder lever and the live lever rod, means being provided for moving the slack adjuster with relation to the cylinder lever as wear on the brake shoes progresses. The means for accomplishing this result consists in a casing or housing within which are inclosed a plurality of adjusting blocks. This housing always retains the same relative position with relation to the push rod, but as wear progresses one or more of the blocks, just mentioned, drop behind the cylinder lever, which is thus always kept in the proper position to apply the brakes regardless of the amount of wear which has taken place on the brake shoes. It will be apparent that by this construction greater simplicity is attained with a consequent less cost of original installation and up-keep. These and other advantages of my invention will be more readily understood by reference to the accompanying drawings in which:

Figure 1 is a plan view showing my improved slack adjuster in connection with the brake cylinder, cylinder lever and its associated parts. Fig. 2 is a side elevation of the parts shown in Fig. 1. Fig. 3 is an enlarged vertical section through my slack adjuster and the parts directly associated therewith, the adjusting blocks being shown in their normal operative positions. Fig. 4 is a vertical section similar to Fig. 3, showing the adjusting blocks as elevated in order to allow full release of the cylinder lever and its associated live lever rods. Fig. 5 is a transverse section on the line 5—5 of Fig. 3. Fig. 6 is a transverse section on the line 6—6 of Fig. 3. Fig. 7 is a transverse section on the line 7—7 of Fig. 4.

The push rod 10 operates in connection with the brake cylinder 11 in the ordinary and well known manner.

The slack adjuster 12 is provided with a sleeve 13 having the slot 14 within which the pin 15, passing through the end of the push rod 10, operates. The slack adjuster 12 has near its bottom, the opening 16 through which the cylinder lever 17 is adapted to move. This cylinder lever 17 is pivotally connected at one end with the hand brake rod 18 and on its opposite end with the live lever rod 19 which is connected in the well known manner with the brake shoes at one end of the car. The hodge rod 20 is pivotally connected to the cylinder lever 17 at a point midway between its connection with the live lever rod 19 and its connection with the slack adjuster, as will be described hereafter. On its opposite end, the hodge rod 20 is pivotally connected with the lever 21, which in turn is pivotally connected at one end with the boss 22 on the brake cylinder 11 and at its opposite end with the live lever rod 23.

The cylinder lever 17 operates on the brackets 24 which are attached to the bottom of the car by means of the bolts 25. In this way the cylinder lever 17 is always held in a horizontal position. The two rods or bars 26, 26 are held in engagement with the top surface of the cylinder lever 17 by means of the springs 27, the tension of which is adjusted by means of the nuts 28 on the bolts 25. It will be evident that by adjusting the nuts 28, the frictional engagement with the upper surface of the cylinder lever 17 may be correspondingly adjusted.

The slack adjuster is provided with a cover 29 which has holes registering with pins 30 through which pass the cotter pins 31, thus holding the cover securely in position. When the cover 29 is removed, the adjusting blocks 32 may be placed inside of the slack adjuster. Connected with the cylinder lever 17 by means of the pivot 33, is the rod 34 which passes forwardly through a suitable opening in the end of the slack adjuster. It will be apparent that when the cylinder lever 17 is moved to the position shown in Fig. 4, all of the adjusting blocks 32 will be held in an elevated position on top of the rod 34. Each of the adjusting blocks 32 has a vertical slot 35 within which the rod 36 is adapted to operate. This rod has on its end a pin 37 which engages the slot 38 in the end of the crank 39 which is mounted on the release rod 40. The end of rod 36, opposite to that having the pin 37, is beveled and adapted to slide over the inclined surface 41 within the casing of the slack adjuster. The opposite end of the slack adjuster has the slot 42 which serves to guide the rod 36 by means of its pin 37. The slot 42 is parallel with the surface 41 so that it will be evident that if the release rod 40 is rotated, the rod 36 will be elevated and moved to the left into the position shown in Fig. 4, thereby elevating at the same time all of the adjusting blocks 32.

As best shown in Fig. 1, the portion of the cylinder lever 17 within the slack adjuster 12 has a slightly curved edge 43 forming engagement with any one of the adjusting blocks 32 which may have dropped into a position behind the cylinder lever 17, as will presently be explained.

Having thus described the construction of the parts of my improved slack adjuster, its operation may now be readily understood. When the brakes are in their normal release position, the pin 15 on the end of the push rod 10, will lie at the left hand end of the slot 14. If it is desired to apply the brakes, the push rod 10 is moved to the right in the well known manner, and all of the parts remain stationary until the pin 15 reaches the right hand end of the slot 14. When this happens pressure is applied to the cylinder lever 17 through the slack adjuster which itself is carried to the right. The cylinder lever turns on its connection with the hodge rod 20 as a pivot and the live lever rod 19 is moved to the left, thereby applying the brakes. At the same time, the hodge rod 20 is carried to the right, thereby serving to move the lever 21 and the live lever rod 23 to the right thereby applying the brakes simultaneously on both ends of the car. We will assume that in a single application of the brakes, the brake shoes have become worn to a considerable extent. When it is desired to release the brakes, the push rod 10 is moved to the left, thereby immediately releasing the pressure of the brake shoes on the car wheels and holding them lightly in contact therewith, or possibly just clear of the wheels. The push rod 10 continues to move to the left until the pin 15 reaches the left hand end of the slot 14. Inasmuch as the slot 14 is of just sufficient length to give the desired release of the brake shoes, and since during this single application the brake shoes have become worn to a considerable extent thereby causing the slack adjuster 12 to move an undue distance to the right, it will be apparent that the left hand end of the slot 14 will be engaged before the push rod 10 has returned to its normal position; the slack adjuster 12 will in this way be moved to the left as further movement of the push rod 10 continues, but by means of the friction rods 26, the cylinder lever 17 will be prevented from moving with the slack adjuster. The result of this will be that as the slack adjuster 12 continues to move to the left, one or more of the adjusting blocks 23 will drop behind the cylinder lever 17 and we shall have the condition indicated in Fig. 3. On the next application of the brakes, the push rod 10 will move to the right until the right hand end of the slot 14 is reached, when the brake shoes will immediately be applied to the wheels on the application of further pressure from the push rod through the slack adjuster. As further wear occurs on the brake shoes additional adjusting blocks 32 will drop behind the cylinder lever 17 thereby moving its pivotal point farther to the right. The function of the hodge rod 20 is, of course, as is well known, to regulate the pressure at the two ends of the car, so that it is immaterial on which end of the car the wear on the brake shoes occurs, as the slack adjuster will operate equally whether the wear occurs on the brake shoes associated with the live lever rod 19 or the live lever rod 23. When it is desired to replace a brake shoe and to obtain a full release of the live lever rods 19 and 23, the release rod 40 is rotated, thereby moving all of the adjusting blocks 32 into the position shown in Fig. 4 in which case the slack adjuster 12 may be moved to its extreme position to the left thereby moving the live lever rods 19 and 23 to their full release positions so that ready access is obtained to the brake shoes.

It will be apparent to those skilled in the art that many changes could be made in the detailed construction of the parts which I have described without departing from the spirit of my invention.

What I claim is:

1. A slack adjuster comprising a casing and adjusting means within said casing, said adjusting means adapted to actuate a cylinder lever when moved in one direction and to form new engagement with said cylinder lever when moved in the opposite direction, thereby leaving the cylinder lever in a stationary position, substantially as described.

2. In a brake system, the combination of a push rod, a cylinder lever, and a slack adjuster comprising a casing and adjusting means within said casing, said adjusting means adapted to actuate the cylinder lever when moved in one direction and to form new engagement with the cylinder lever when moved in the opposite direction and allowing lost motion with respect to said push rod, substantially as described.

3. A slack adjuster comprising a casing and a plurality of adjusting blocks within said casing, said slack adjuster adapted to engage a cylinder lever when moved in one direction and to form new engagement therewith by means of said blocks when moved in the opposite direction, substantially as described.

4. In a brake system, a push rod, a cylinder lever, and a slack adjuster comprising a casing and a plurality of adjusting blocks, said slack adjuster having lost motion with respect to said push rod and adapted to actuate said cylinder lever when moved in one direction and to form new engagement with the same when moved in the opposite direction, substantially as described.

5. In a brake system, the combination of a push rod, a cylinder lever, a slack adjuster comprising a casing and a plurality of adjusting blocks within said casing, said slack adjuster adapted to engage said cylinder lever when moved in one direction and to move independently of the cylinder lever but forming new engagement therewith by means of said adjusting blocks when moved in the opposite direction, and means for releasing said blocks from engagement with said cylinder lever, thereby allowing movement of the cylinder lever to full release position, substantially as described.

6. In a brake system, the combination of a cylinder lever, a slack adjuster comprising a casing and a plurality of adjusting blocks within said casing, and means for preventing engagement of said blocks with said cylinder lever except on one side, said slack adjuster thereby adapted to actuate said cylinder lever when moved in one direction and to form new engagement therewith when moved in the opposite direction, substantially as described.

7. In a brake system, the combination of a cylinder lever, a slack adjuster comprising a casing and a plurality of adjusting blocks within said casing, and means for preventing engagement of said blocks with said cylinder lever except on one side, said slack adjuster thereby adapted to actuate said cylinder lever when moved in one direction and to form new engagement therewith when moved in the opposite direction, and means for releasing said blocks from engagement with said cylinder lever, substantially as described.

8. A slack adjuster comprising a casing, a plurality of adjusting blocks within said casing, each of said blocks having a vertical slot therein, and releasing means adapted to raise said blocks thereby removing them from engagement with said cylinder lever, substantially as described.

9. A slack adjuster comprising a casing having an oblique surface on its interior, and a plurality of adjusting blocks within said casing and adapted to engage a cylinder lever, each of said blocks having a vertical slot therein, a rod engaging said oblique surface and movable within said slots, and means for raising said rod thereby removing said blocks from engagement with the cylinder lever, substantially as described.

10. A slack adjuster comprising a casing having an oblique surface on its interior and a slot in said casing parallel with said oblique surface, a plurality of adjusting blocks within said casing and adapted to engage said cylinder lever, each of said blocks having a vertical slot therein, a rod adapted to engage said oblique surface and a slot in said casing and passing through the slots in said adjusting blocks, and means for raising said rod thereby causing disengagement of said adjusting blocks from said cylinder lever, substantially as described.

CYRUS L. BUNDY.

Witnesses:
RUDOLPH C. E. MAY,
JOHN PRITCHARD.

---

Copies of this patent may be obtained for five cents each, by addressing the "Commissioner of Patents, Washington, D. C."